Figure 1:
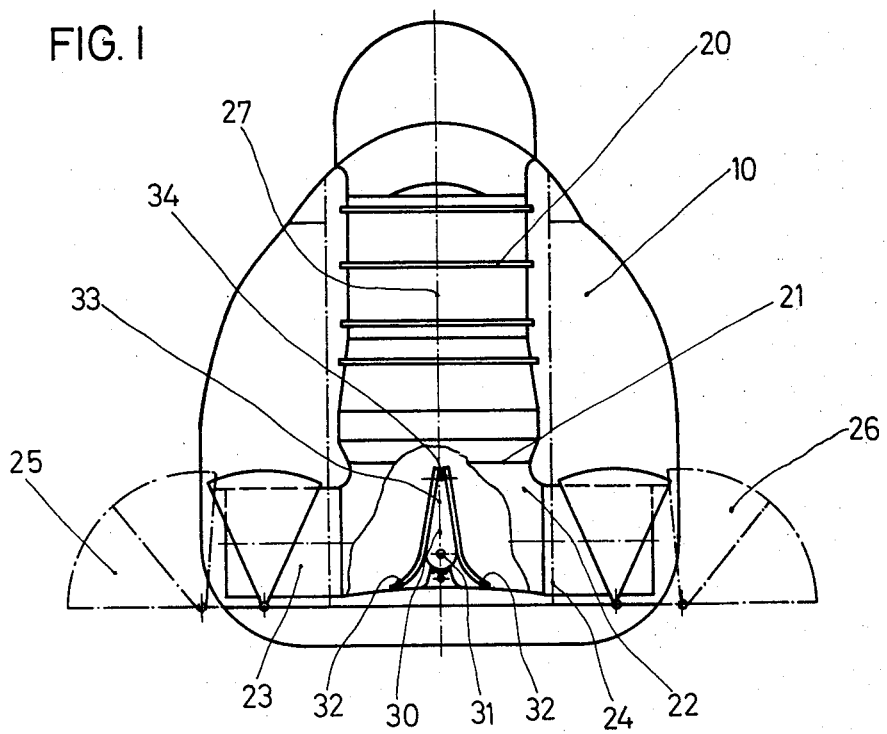

United States Patent
Lincks et al.

[15] 3,703,266
[45] Nov. 21, 1972

[54] CONTROL UNIT FOR THE LIFT ENGINES OF VERTICAL AND SHORT TAKEOFF AIRCRAFT

[72] Inventors: Hans Lincks; Erich W. Weigmann, both of Munich, Germany

[73] Assignee: Messerschmitt-Bolkow-Blohm GmbH, Munchen, Germany

[22] Filed: May 18, 1970

[21] Appl. No.: 38,062

[30] Foreign Application Priority Data

June 4, 1969 Germany..........P 19 28 503.1

[52] U.S. Cl..................................244/52, 244/55
[51] Int. Cl. ...............................................B64b 1/36
[58] Field of Search............................244/52, 53-55, 244/12 D, 23 D, 110 B; 60/229, 230; 239/265.25, 265.27, 265.29, 505-509; 137/612, 625.44

[56] References Cited

UNITED STATES PATENTS

| | | |
|---|---|---|
| 3,313,500 | 4/1967 | Schmitt.......................244/53 |
| 2,637,164 | 5/1953 | Robson et al.........239/265.25 |
| 3,333,793 | 8/1967 | Opfer et al....................244/52 |

*Primary Examiner*—Trygve M. Blix
*Attorney*—Woodhams, Blanchard and Flynn

[57] ABSTRACT

Control unit for the lift engines of vertical or short takeoff aircraft for correction of motion preferably in relation to the roll axis. The lift engine discharges into a branched conduit of which each respective branch discharges to opposite external sides of the aircraft fuselage Infinitely adjustable means are provided for selecting and proportioning as desired the respective amounts of the engine discharge introduced into and conducted through said respective branches.

3 Claims, 6 Drawing Figures

INVENTORS
HANS LINCKS
ERICH W. WEIGMANN
BY Woodhams, Blanchard & Flynn
ATTORNEYS INVENTORS
HANS LINCKS
ERICH W. WEIGMANN
BY
Woodhams, Blanchard & Flynn
ATTORNEYS

CONTROL UNIT FOR THE LIFT ENGINES OF VERTICAL AND SHORT TAKEOFF AIRCRAFT

The invention relates to a control unit for the lift engines of vertical or short takeoff aircraft for correction of motion, preferably in relation to the roll axis.

One control unit for aircraft with rotating wings and gas turbine is already known. In this control unit, a hollow frustrum cone, surrounding with its larger inlet opening the gas jet discharge opening, may be swivelled about a vertical axis arranged at this larger outlet opening and acts together with a vane device composed of two symmetric parts, connected with the aircraft fuselage with appropriate fasteners and swivelled about a horizontal axis provided at the fuselage. Said vane device is arranged outside of and behind the smaller discharge opening of the frustrum cone. This known arrangement serves chiefly for the compensation of the restoring moment of the fuselage caused by the drive of the wing screw. Because of the high mechanical requirements of the components, this known arrangement is not suitable for the motion correction by thrust jet increase or decrease for the lift engines of a VTOL aircraft.

The object of the invention is to provide a simple control device for the engines of a vertical or short takeoff aircraft, which, during the vertical takeoff phase, keeps the aircraft stable especially in the roll axis. This is achieved by variably distributing the lift jet of the engine to the exhaust gas pipes of a so-called breeches pipe by means of pivotal mechanisms and/or control flaps. The control flaps may be pivoted about an axis at a right angle with the longitudinal axis of the engine and are provided with gas guide plates which are automatically pivoted about an axis arranged at the flap tip.

These designs permit the distribution of the lift jet of the engine as required and cause a change of the gas moment arm in relation to one of the aircraft axes, preferably the roll axis, for the attitude correction at vertical or short takeoff. Furthermore, it is provided that the control flap be slidable in guides at a right angle with the longitudinal axis of the engine or a distributing body, whose shape facilitates flow, is arranged with sliding support for the distribution of the thrust jet.

A special embodiment of the invention suggests that the engine be pivotal over the exhaust gas pipe of a so-called breeches pipe by means of a pivoting device and the breeches pipe and the engine are connected by means of metal bellows. This embodiment of the invention, also permits a thrust modulation whose efficiency is considerably improved as against the arrangements so far known.

Figure 2:
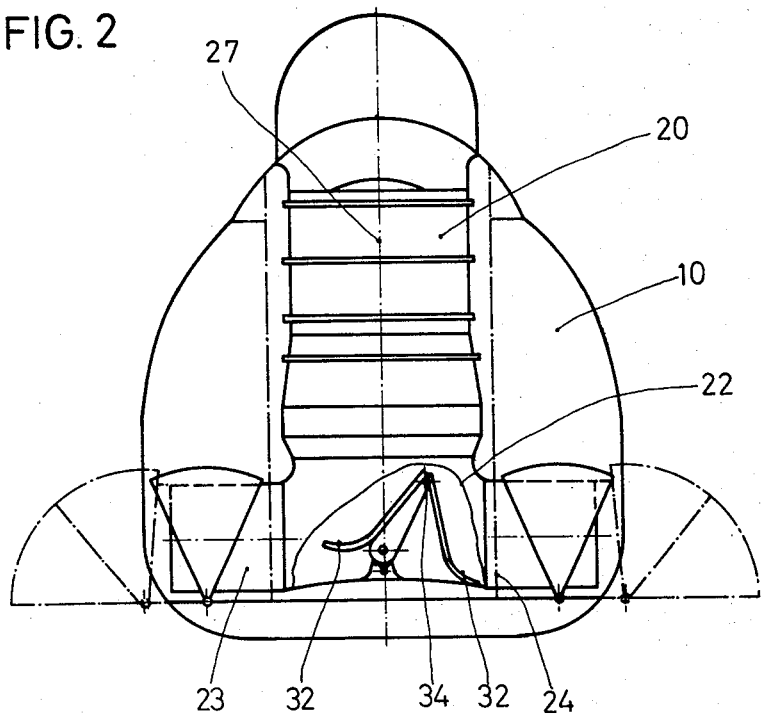
Figure 3:
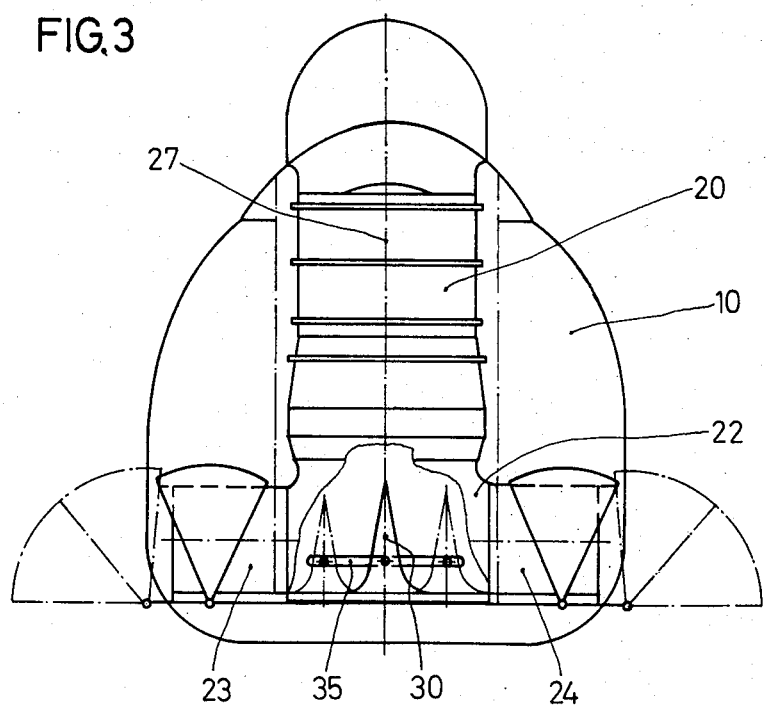
Figure 4:
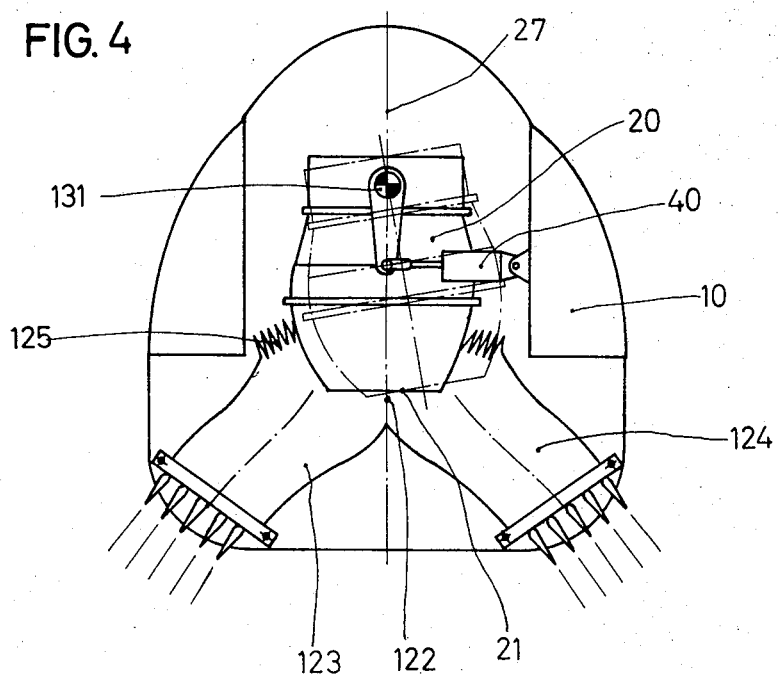
Figure 5:
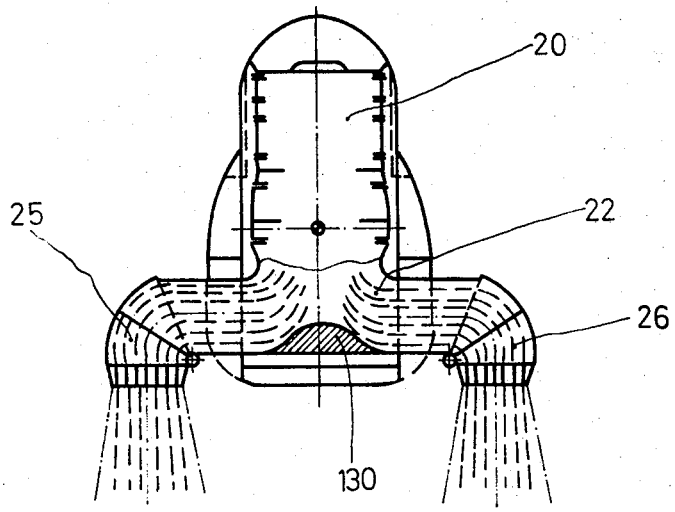
Figure 6:
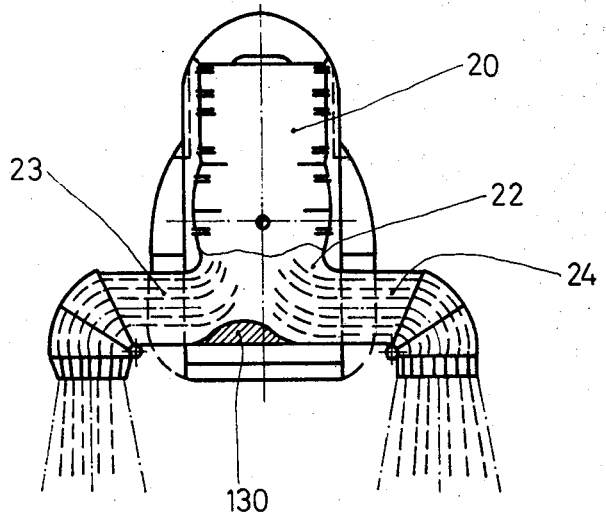

The invention is described and illustrated in the following by which further advantages and objectives will be understood. The figures show:

FIG. 1 a schematic representation of a partial section of an arrangement of the invention, at complete balance, FIG. 2 a partial section according to FIG. 1 in a working phase, FIG. 3 a schematic representation of a partial section of one embodiment of the invention, FIG. 4 a schematic representation of a partial section of a second embodiment of the invention, FIG. 5 a schematic representation of a partial section of a third embodiment of the invention in the balance phase, FIG. 6 a partial section according to FIG. 5 in a working phase.

In an aircraft fuselage 10 (FIGS. 1 and 2), a jet engine 20 is arranged at a right angle with the longitudinal axis of the aircraft. The end 21 of the engine discharges into a so-called breeches pipe 22, the two exhaust gas pipes of which lead to respective external sides of the fuselage. In the illustrated embodiment of the invention, so-called dome deflectors 25, 26 for jet deflection have been arranged at the two exhaust gas pipes 23, 24.

In the center of the breeches pipe 22 at the level of the longitudinal axis 27 of the engine, a control flap 30 is provided, which may be pivoted about an axis 31 at a right angle with the longitudinal axis 27 of the engine. To prevent any undesirable turbulence of the thrust jet behind the jet distributing control flap 30, the invention provides gas guide plates 32 mounted on both sides of the flap 30. These gas guide plates 32 are automatically pivoted about an axis 34 arranged at the flap tip 33, by the pivotal movement of the flap 30.

FIG. 3 shows another embodiment of the invention. Here, the control flap 30 is not pivoted but slided in guide 35 which are mounted in or at the breeches pipe 22 and/or its exhaust gas pipes 23, 24. This control flap may also be provided with gas guide plates similar to the gas guide plates 32 but not here illustrated. The exhaust gas jet is divided by the control flap 30 and distributed to the exhaust gas pipes 23, 24 in quantities depending upon the required attitude of one of the aircraft axes. The breeches pipe 22 may be installed in the aircraft fuselage both in the longitudinal axis and at a right angle with it.

FIG. 4 shows another embodiment of the invention. The engine 20 is supported on a pivotal axis 131 which is at a right angle with the longitudinal axis of the engine 20. The end of the engine 20 discharges into a breeches pipe 122. A pivoting device 40 moves the engine 20 about the axis 131 so that the exhaust gas pipes 123, 124 are supplied with quantities of gas depending upon the required or prevailing flight condition. To permit the engine 20 to be movable in and with respect to the breeches pipe 122, the end of the pipe which is adjacent the engine is provided with metal bellows 125 which are also attached to engine 20. Thus, an ample freedom of movement is ensured together with complete gas sealing.

FIGS. 5 and 6 shows another embodiment of the invention, It has a distributing body 130 for the quantitatively variable thrust jet distribution. This distributing body has a shape which facilitates flow and is arranged with a sliding support.

The embodiments of the invention in which an exclusive property or privilege is claimed are defined as follows:

1. In vertical or short takeoff aircraft having a lift engine for distribution of the exhaust gas into a branched exhaust gas outlet tube, a control unit for the correction of motion in relation to the attitude of the aircraft axes, the improvement comprising:

means for mounting said lift engine in said aircraft fuselage, the axis of said lift engine being at a transverse angle to the longitudinal axis of said aircraft;

adjustable distributing means for adjustably distributing a selected amount of said exhaust gas into selected ones of said branches of said exhaust gas outlet tube, said adjustable distributing means including a control flap in said outlet and first pivot means for pivotally supporting said control flap about an axis which is at a right angle with the longitudinal axis of said lift engine, a pair of gas guide plates and second pivot means for pivotally securing each of said gas guide plates to said control flap at the end thereof remote from said first pivot means.

2. A control unit according to claim 1, wherein the control flap has on both sides gas guide plates which are adapted to be automatically pivoted about an axis arranged at the tip of the flap.

3. A control unit according to claim 1, wherein said transverse angle is a right angle.

* * * * *